United States Patent [19]

Betensky et al.

[11] 4,427,883

[45] Jan. 24, 1984

[54] OPTICAL SENSING SYSTEM FOR EXTENSIBLE TAPE RULES

[75] Inventors: Ellis I. Betensky, New York, N.Y.; William J. Hildebrandt, Simsbury, Conn.

[73] Assignee: The Stanley Works, New Britain, Conn.

[21] Appl. No.: 267,632

[22] Filed: May 27, 1981

[51] Int. Cl.³ .............................................. H01J 3/14
[52] U.S. Cl. ................................ 250/237 G; 356/395
[58] Field of Search ............ 250/237 G, 231 SE, 216; 356/395; 340/347 P; 33/138, 139, 140

[56] References Cited

U.S. PATENT DOCUMENTS

| | | | |
|---|---|---|---|
| 3,175,093 | 3/1965 | De Lang | 250/237 G |
| 3,573,468 | 4/1971 | Lang | 250/237 G |
| 3,796,498 | 3/1974 | Post | 250/237 G |
| 4,164,816 | 8/1979 | Bergkvist | 33/139 |
| 4,263,506 | 4/1981 | Epstein | 250/231 SE |

Primary Examiner—David C. Nelms
Attorney, Agent, or Firm—Prutzman, Kalb, Chilton & Alix

[57] ABSTRACT

The present invention relates to coilable extensible rules or the like. More specifically, the present invention is concerned with a new and improved optical sensing system for extensible tape rules of the type that provide a visual display of the measurement readings, such as the digital tape rule described in the Hildebrandt et al U.S. Pat. No. 4,161,781, the disclosure of which is incorporated herein by reference.

13 Claims, 4 Drawing Figures

OPTICAL SENSING SYSTEM FOR EXTENSIBLE TAPE RULES

BACKGROUND ART

Heretofore, optical sensing systems have been used in various measuring devices for accurately measuring the relative movement of two objects. These systems typically have employed photoelectric detectors and have utilized two or more optical gratings to control a light-dark measurement pattern sensed by the photoelectric detectors. Usually, the light-dark pattern is in the form of an optical interference fringe signal, commonly referred to as a Moiré fringe. This fringe signal is a very gradual light variation from a condition of full illumination to a condition of full darkness. An example of such a system can be found in U.S. Pat. No. 3,796,498 wherein a movable scale grid travels parallel to and in close proximity with a stationary index grid and the resultant moire fringe pattern is focused on a photoelectric detector. However, it has been recognized that dirt, smudges, scale wear or similar defects in or on the scale grid, can cause substantial error and that such an error is magnified where only a small gap is maintained between the two grid members. The more recently issued U.S. Pat. No. 4,079,252 recognized some of the problems associated with the narrow gap arrangement used thereto fore and described a measuring apparatus utilizing a "fringe pattern" that provided a considerable gap between the grid and a lens for focusing the resulting fringe pattern onto the detector. Of course, as will be appreciated, the focused pattern is still a spacially periodic distribution of radiation with a substantial variation of light intensity. This spatial variation of light intensity is typical of sinusoidal character and the detector must focus on and respond to only a small protion of the spatial light intensity cycle to detect a substantial contrast between the highest intensity areas of light and darkness.

Another device using an optical measuring system employing a fringe pattern is disclosed in U.S. Pat. No. 3,578,979 wherein the index grid is spaced substantially from a scale grid, with the former grid being formed directly on one surface of the photoelectric element. In this device direct specular reflection, rather than diffuse or indirect reflection for illumination of the scale grid, is required in order to provide proper definition of the scale image projected onto the index grid. Of course, as can be appreciated, in a system of that type the photodetector must be quite large and accurate placement of the index grid on the detector is extremely critical. Even a very slight manufacturing variation will adversely affect the operation of the device. This is particularly true if that system were used with a flexible blade whose lateral position shifts and may allow ambient light into the system.

DISCLOSURE OF INVENTION

In accordance with the present invention, an optical sensing system is provided for a coilable tape measure which employs a pair of spaced optical grids but avoids the use of a narrow gap between the grids, the use of a moire fringe pattern signal with a spatial light intensity variation and the use of direct specular reflection of the scale grid. Instead the system uses multiple optical channels, preferably four, with each channel generating an optical signal that has essentially no spatial light variation across its entire output image field. The signal, of course, varies within each channel as the blade, and therefore the pattern thereon, moves but each channel advantageously is provided with a large output image field and the light flux intensity is uniform across the entire field for any particular position of the blade.

The channels are arranged, preferably in tandem, so that each is optically phased 90° from its adjacent channel by virtue of the relative placement of the apertures in its optical mask. Thus, through suitable electronics associated with a photo detector in each channel, the direction of blade motion is determined, counting takes place and error monitoring is acheived. This is accomplished by illuminating the blade pattern with diffuse light and forming a sharp image of this pattern on an optical mask of exactly the same pitch and pattern as that of the image. The light flux passing through the mask will vary from a maximum value when the light portions of the image are in full registry with the apertures of the mask to a minimum when dark parts of the image are in full registry with those apertures.

Theoretically, the variation of the light flux for a uniformly moving blade should be a triangular wave form. Actually, because of fringe effects, imperfect absorption and reflection by the pattern on the blade, light leakage, etc., the variation is more sinusoidal. Since the apertured mask matches the image pattern exactly, the light flux passing through any aperture is the same as through any other aperture within the same channel and thus uniform across the field. A field lens, immediately down stream of the optical mask, gathers all the light passing through the mask and concentrates it on a photo detecting cell. Since the apertured mask is practically in the plane of field lens, the lens essentially does not see either the apertures of the mask or the image pattern projected thereon. Rather, the field lens sees an image of the objective lens as modulated by the mask and focuses that modulated image on the photo detector. This image, containing all the light flux that passes through the mask uniformly changes from minimum to maximum brightness in an essentially sinusoidal manner as the blade moves along its axis relatively to the lens system.

This system provides not only the foregoing features and advantages but also is adapted to focus the light signal onto a small portion of the detector surface so that precise placement of the detectors relative to the tape blade is not essential and greater manufacturing tolerances are permitted. Thus, the system provides a uniform yet composite light signal using a relatively large output image field thereby reducing the risk of error due to changes in the reflective quality of the tape as a result of wear or dirt or other irregularities inadvertently present on the tape blade.

In addition to the foregoing advantageous characteristics, the system of the present invention utilizes diffused or scattered light to provide a greater relative difference in the level of reflection from the different grid areas of the blade. The use of direct reflected light tends to interfere with the desired modulated light signal and therefore is avoided. The improved contrast of the diffused light permits easier tuning of the system and allows for greater manufacturing tolerances than would otherwise be possible. A much higher contrast ratio is provided regardless of how large a portion of the mask is viewed by each detector since, as mentioned, the system employs a uniform intensity across the field of each channel as opposed to the gradual light intensity variation associated with a moiré fringe. Additionally, the system of the present invention utilizes a field or concentrating lens that reduces problems associated with misalignment or manufacturing variations in the flexible tape blade while employing several channels and associated detectors in tandem to lessen any possible errors in the sensing system and reduce the possible variation in reflective quality resulting from wear, dirt or the like.

The system of the present invention also avoids the alignment and manufacturing problems associated with the magnification and projection of the small pitch grids used to produce the moiré effect. This is achieved by using a substantially larger pitch that is far easier to handle mechanically and by providing a modulated image at the detector.

Other advantages and features will be in part obvious and in part pointed out more in detail hereinafter.

These and related objects are achieved in accordance with the present invention by providing an optical sensing system for an extensible tape rule and the like comprising a movable elongated tape blade having optical markings forming a grid along the length thereof, photoelectric detector means spaced substantially from the grid, a light source for illuminating a portion of the grid as it moves relative to the detector means, an optical grating mask positioned between the grid and the detector means and first lens means intermediate the grid and the optical grating mask for focusing an image of the grid on the mask. The first lens means is positioned relative to both the light source and the grid so as to receive a diffuse reflection of the illuminated tape grid and to focus a sharp and clear image signal of the illuminated grid on the optical grating mask whereby the mask modulates the signal uniformly across its output image field. The system includes a second lens means immediately adjacent and optically downstream of the mask for concentrating the uniformly modulated signal passing through the optical mask and directing it to the detector means as a composite signal.

A better understanding of the objects, advantages, features, properties and relationships of the invention will be obtained from the following detailed description and accompanying drawings which set forth an illustrative embodiment and are indicative of the way in which the principles of the invention are employed.

DESCRIPTION OF A PREFERRED EMBODIMENT

Figure 1:
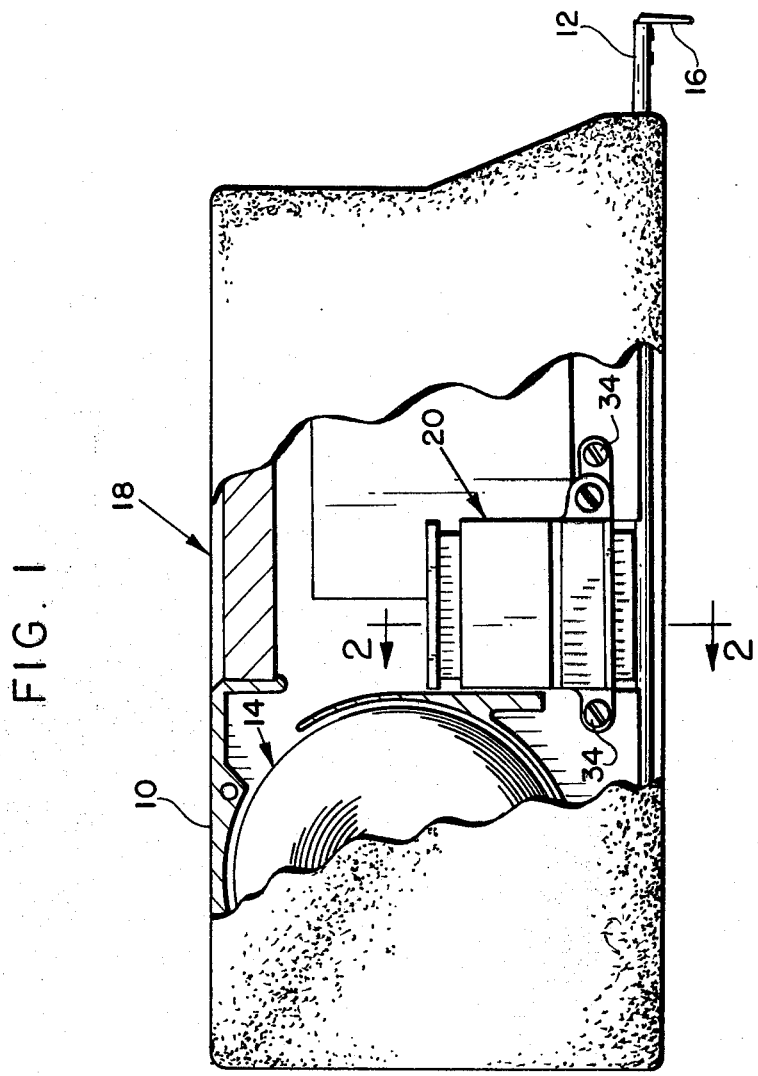
FIG. 1 is a side elevational view of a coilable extendible digital tape rule, partly broken away and partly in section, showing the incorporation therein of an optical sensing system embodying the features of the present invention.

Referring now to the drawings in greater detail wherein like reference numerals indicate like parts throughout the several figures, FIG. 1 shows a measuring apparatus in the form of an extensible tape rule comprising a thin elongated housing 10 having a generally rectangular configuration, the housing typically being of a size that permits it to be held easily in the hand of the user. A measuring tape element or blade 12 is stored within the housing 10 in coiled form, as shown at 14, under the biasing force of a return spring (not shown). Typically, the blade is of metal, such as spring steel, and is an extremely thin member that exhibits a slightly curved transverse configuration, best seen in FIG. 2. One end of the blade is fixed within the housing, typically in cooperation with the return spring, while the opposite or free end of the blade extends out from the housing through a suitable passage in one end wall thereof and, as shown, is provided with a hook element 16 that facilitates the use of the blade. In a well-know manner, the blade is extended from the housing against the biasing force of the return spring and when the housing is provided with a position locking member, the blade can be retained in its extended position until the locking member is released so that the blade may be retracted into the casing and coiled within its storage location therein. As will be appreciated, the housing may include numerous other components that need not be fully described herein, such as a readout display area 18 in the top edge thereof, an internal compartment for the storage of batteries or the like, an external keyboard and related circuitry, as well as other features.

Figure 3:
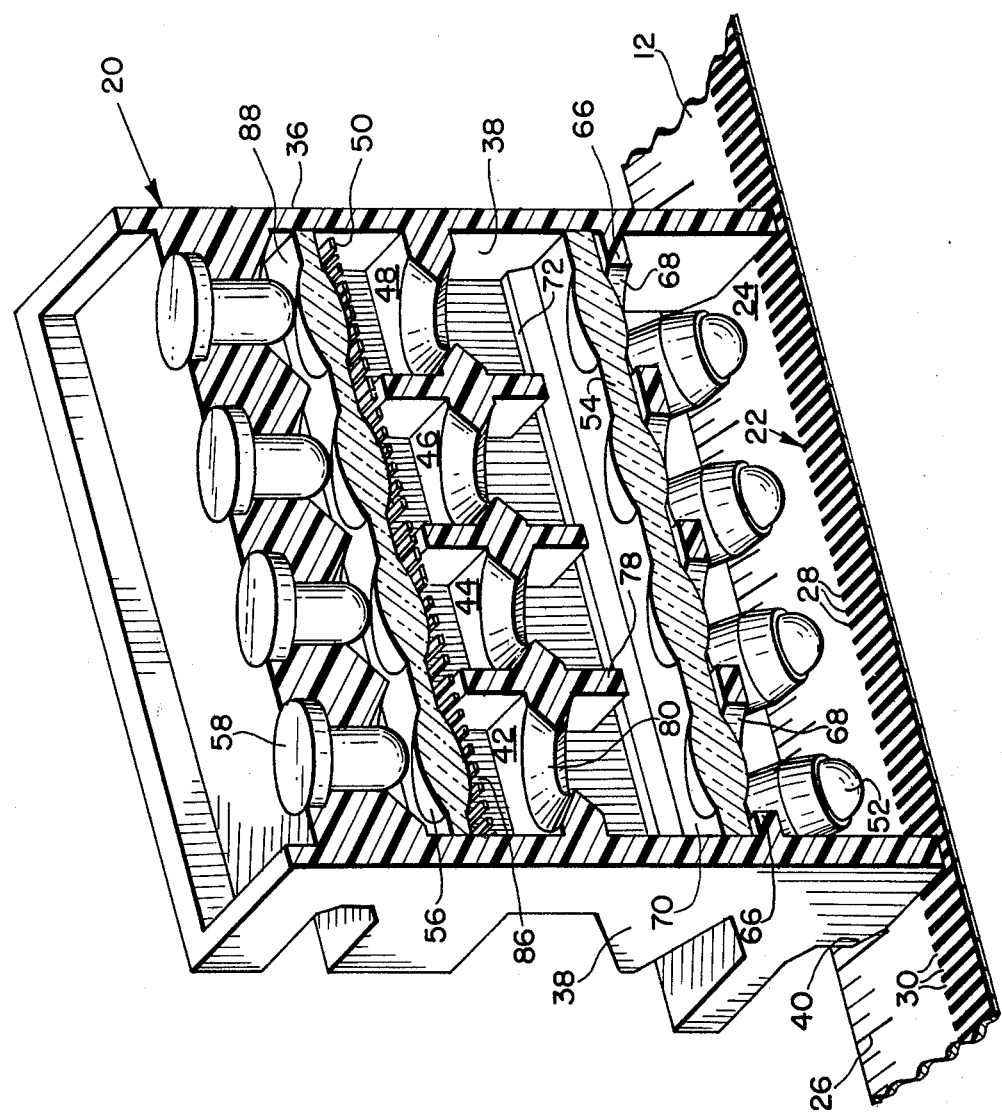
FIG. 3 is a sectional view of the optical sensing system of FIG. 2 taken along the line 3—3 of FIG. 2.

In accordance with the present invention, the tape rule measuring device includes an optical sensing system wherein a stationary optical reading head or pickup assembly, generally designated 20, operatively cooperates with a grid 22 of optical markings carried by the tape for sensing the position of the tape relative to a fixed point on the housing 10 as the tape moves between its extended position and its coiled retracted position. As best shown in FIG. 3, the optical markings are provided on the surface 24 of the tape blade that also contains conventional visual graduations or indicia 26, this surface being the concave surface facing the interior of the housing as the blade travels between its coiled and extended positions. As shown, the optical markings 22 are located along the longitudinal center line of the blade between its parallel edges and are generally elongated rectangular markings that extend transversely of the blade, that is, in a direction perpendicular to the center line and to the direction of travel of the blade. The optical markings comprise adjacent areas of first and second optical characteristics in the form of adjacent light absorbing (dark) bars 28 and light reflecting (light) areas 30 of substantially identical size and configuration. As can be appreciated, the optical markings 22 can be printed on the tape blade 12 in a manner similar to the application of the standard graduations and indicia 26 and the light areas 30 can simply be unprinted tape surface areas of light color, for example yellow, or can be of a light color different from the unprinted background of the remainder of the blade. Each bar 28 of the grid pattern preferably extends transversely an equal distance on each side of the blades' longitudinal center line for a distance of approximately 2 millimeters and in the preferred embodiment exhibits a width of 0.4 millimeters with the light areas and dark bars being of identical size or pitch. Thus, each adjacent pair of dark and light bar areas occupies only 0.8 millimeters in the direction of travel of the tape blade resulting in more than 31 such bar pairs for each inch of length of the tape blade. Of course, as can be appreciated, the size and spacing of the grid may be adjusted to suit the optical sensing system within the particular tape rule device.

Figure 2:
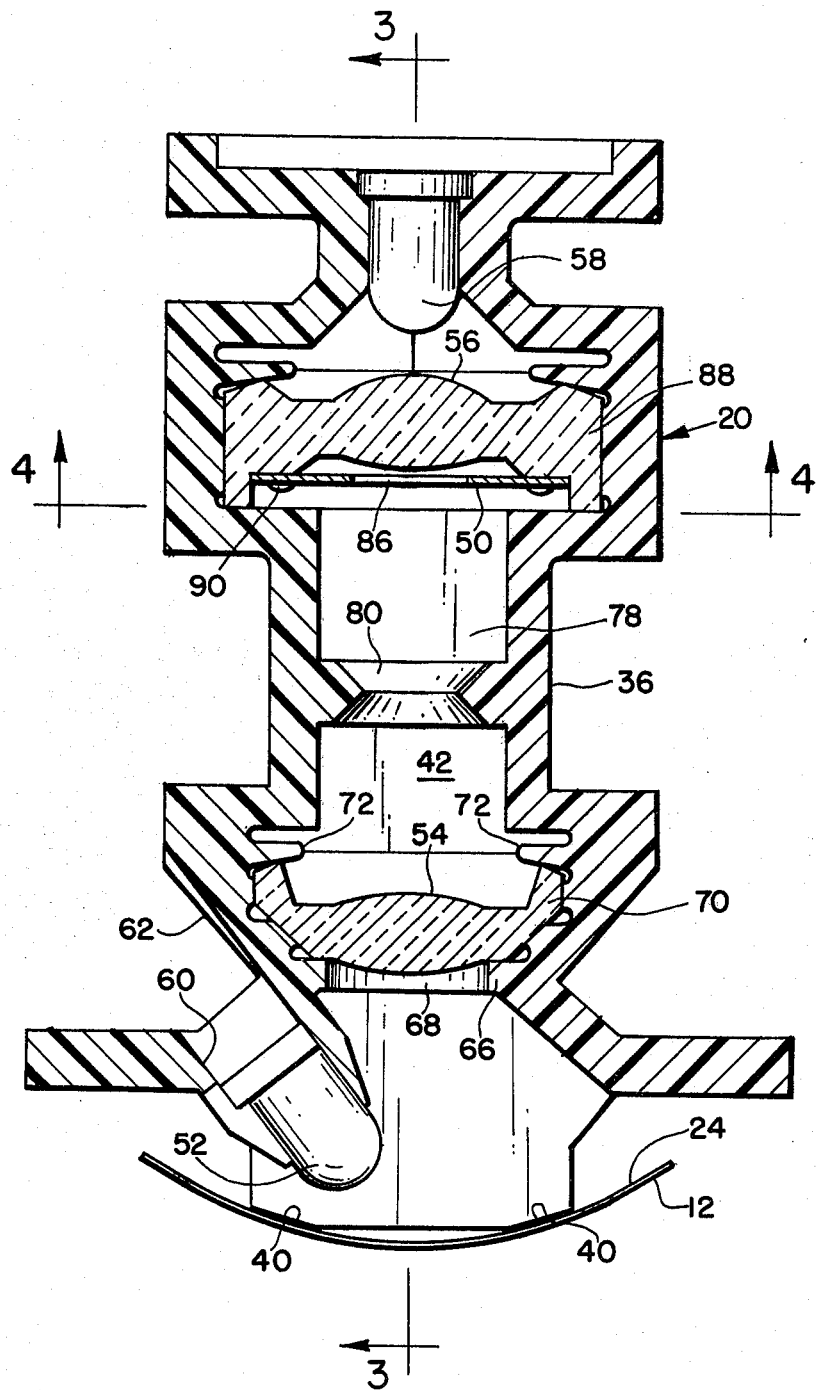
FIG. 2 is a sectional view taken along the line 2—2 of FIG. 1 illustrating the interior of a section of the optical sensing system.

As shown in FIG. 1, the head or pick-up assembly 20 of the optical sensing system of the present invention is fixedly mounted, such as by fasteners 34, within the interior of the tape rule housing 10 intermediate the tape storage coil 14 and the passage in the housing through which the blade 12 extends. The assembly 20 consists of a suitable enclosure or casing 36 which is positioned immediately above the concave face 24 of the blade. The bottom of the elongated casing is mounted in confronting relationships with the concave surface and, as shown in FIGS. 2 and 3, practically touches the blade but is spaced therefrom so that the tape freely passes beneath the casing as it moves between its extended and retracted positions. In its preferred embodiment, the casing 36 is a generally rectangular box-like unit provided with longitudinally spaced end walls 38 having contoured or tapered bottom surface protions 40 that almost engage the concave surface 24 of the tape blade. As best shown in FIG. 2, these surface protions 40 serve to guide the blade 12 during its movement between its extended and retracted positions and limit its inadvertent transverse movement, thereby assuring the central positioning of the blade and, more importantly, of the optical grid 22 carried thereon.

As shown, the casing is divided into a series of four optical reading channels 42, 44, 46 and 48, arranged in tandem along the length of the casing and, consequently, along the direction of movement of the tape blade, thereby facilitating the utilization of a multiphase optical mask 50 whereby light in quadrature will produce the desired uniform modulation of the light signal received from the grid in each channel. This provides clear cut and definitive signals from each of the operative reading channels where the phase shift in the mask is 90° between adjacent portions of the mask positioned within adjacent reading channels, as will be described in greater detail hereinafter.

Each reading channel or section in the casing 36 is substantially identical except for the aforementioned phase shift of the apertures within the multiphase mask. Therefore, for simplicity of description and ease of understanding, only the optical path within a single channel, such as channel 42, need be considered in detail. As shown in FIGS. 2 and 3, each channel is provided with a source of illumination, such as light 52, for illuminating the grid 22 of optical markings on the tape blade, an objective lens 54 for projecting and focusing the image of the grid onto the optical mask 50 that modulates the light flux projected thereon, a condenser or field lens 56 for receiving and concentrating the modulated signal and a photoelectric detector 58 for receiving the modulated composite signal.

In the specific embodiment illustrated, the light source 52 is a light emitting diode (LED) mounted within a port 60 in the side wall 62 of the casing 36. The port 60 and LED 52 are positioned laterally of the longitudinal center line of the blade at an acute angle, for example an angle of about 50°, to the surface of the blade at its center line. The diode fully illuminates the grid on the tape blade, yet at the same time is positioned at such an angle to the grid that the direct or specular reflection of the light emitted by the diode will be out of alignment with the optical path of the channel extending between the illuminated grid 22 on the tape blade and the photoelectric detector 58 mounted thereabove at about the longitudinal centerline of the casing. Thus, the grid on the tape blade is fully illuminated by the light emitting diode so that diffuse reflections are received therefrom by the lens system of the overlying reading channel. As can be appreciated, one or more of such diodes may be used within each station for this illuminating function or multiple stations may be illuminated by a single light source.

The optical casing 36 is provided with a lower or bottom shelf 66 positioned immediately above the light emitting diode. The shelf 66 extends along the full length of the casing between the front and rear end walls 38 and is provided with a series of four circular apertures 68 arranged in tandem so that each aperture is positioned centrally in each channel. An objective lens strip 70 rests on the shelf 66 and is securely fastened within the optical casing by means of appropriate retaining flanges 72 in the side walls of the casing. The strip 70 includes a biconvex objective lens 54 for each channel, with each lens 54 consisting of a spherical surface portion positioned at and partially within a shelf aperture 68 and aspherical surface poriton on the opposite or downstream side thereof to correct optical aberrations resulting from the size of the unit. The objective lens provides not only an imaging of the diffusely illuminated grid 22 onto the optical mask 50, but also a magnification of that image to the extent of 1.5 times its original size. Preferably, the lens 54 exhibits a ratio of effective focal length to total length from blade to detector of about 1 to 5.

Figure 4:
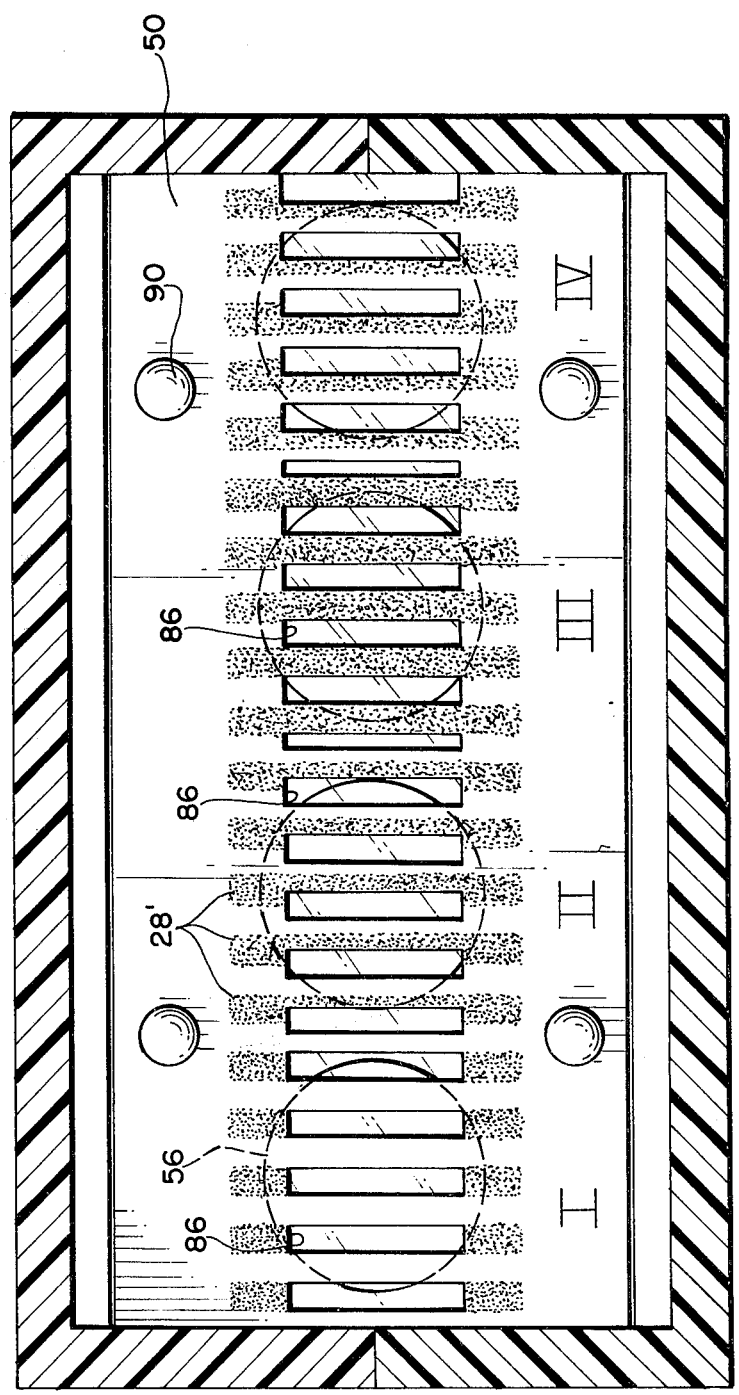
FIG. 4 is a sectional view taken along the line 4—4 of FIG. 2 illustrating the multi-phase optical mask used in the optical system of the present invention with the image of the tape blade grid focused thereon.

Above the objective lens strip 70 and extending between that strip and the apertured mask 50 are a plurality of internal partitions 78 arranged so as to delineate each reading channel and prevent stray light signals flowing between one channel to the next. As shown, the partitions are an integral part of the casing 36 and include a central constriction or neck portion 80 located midway between the lens 54 and the mask 50. The apertured plate or mask 50 on which the grid image is focused by the lens 54, as shown in FIGS. 2 and 3, is spaced from the blade 12 by a substantial distance, for example by about 22 millimeters and extends along the full length of the casing 36. The mask 50 is provided with narrow apertures or optical slots 86 that extend laterally of the casing and have a width substantially equal to the width of the grid image focused thereon by the objective lens. However, the length of each slot 86 is only about 60% of the length of the focused bar image thereby allowing for the inadvertent transverse movement of the tape blade relative to the stationary optical sensing device. The portion of the mask within each reading channel contains a number of such slots 86, e.g., five slots, which are of the same pitch and pattern while the slots in each adjacent section or quarter portion of the mask are shifted to provide a progressive 90° phase separation. Thus, the image of the grid focused on the mask will either be in full registry, only partially in registry or completely out of registry with the optical slots 86 of the mask. These four phases of the mask, indicated by the numerals I-IV in FIG. 4, are arranged in tandem so that the optical slots 86 within alternate sections, such as phases I and III, are 180° out of phase. As illustrated in FIG. 4, these phases provide an exact opposite registry with the grid image.

As mentioned, the grid image that is focused on the mask 60 is larger than the grid 22 carried by the tape blade, preferably about 1.5 times the size of the grid. Accordingly, the optical distance between the objective lens and the mask and the contour of the objective lens is designed so that a sharp clear image of the grid will be focused on a coincident with the plane of the mask 50 in the optical casing. Thus, as illustrated in FIG. 4, the image 28′ of each bar will extend laterally well beyond the ends of the optical slots 86 in the mask 50 that define the usable portion or field of the image to allow for side to side variations in blade printing and guiding. Consequently, if each objective lens sees five bars 28 and their intermediate light areas 30, occupying a length on the blade of 3.6 millimeters, the focused image at the mask occupies a length on the mask of 5.4 millimeters. Of course, each optical slot 86 in the mask has a width 1.5 times that of each bar 28 to provide exact registry along the direction of travel of the grid.

As illustrated in FIG. 4, the bar images 28′ are in full registry with the five optical slots 86 in the first portion I of the mask positioned within the first reading channel 42 and are completely out of registry with the slots 86 in the third poriton III of the mask within channel 46. Of course, a shift in the image by blade movement of as little as 0.2 millimeters will result in bar registry in the second or fourth portions II and IV, yielding the desired shift in the full registry signal in reading channels 44 or 48. As mentioned, this five bar signal modulated by the mask is directed toward the field condenser lens 56 for conveyence to the photelectric detector 58.

Additionally, as is known, the signals reaching the photo detectors in those channels that are 180° out of phase, such as channels 42 and 46 result in a wave form or electronic signal that is in quadrature with the corresponding signals from channels 44 and 48 to provide the desired counting and directional information. As can be appreciated, the arrangement of the channels for the phase shift can be varied; however, the preferred arrangement of the phases as 0°, 90°, 180°, and 270 provide less chance of miscounting through improved error monitoring and detection.

As shown in the drawings, the field or condenser lens 56 for each channel is simply a biconvex lens portion of a lens strip 88 which is mounted within the casing in a manner similar to the objective lens strip 70 to provide its desired function within each reading channel of the optical sensing device. As mentioned hereinbefore, the field lens is positioned immediately adjacent the optical downstream side of the mask 50. In the specific embodiment illustrated, the lens strip 88 is provided with four staking posts 90 extending from its underside edge surfaces for supportably fastening the mast 50 thereto. The posts 90 are well outside the optical path of each reading channel and can be heated to firmly anchor the mask 50 in a fixed position at one surface of the lens strip 88. Due to this close proximity, the lens 56, which includes a spherical upstream surface and an aspherical downstream surface, essentially looks through but does not see the mask modulating the signal from the blade. The same is true of the magnified image focused at the plane of the mask by the objective lens. Thus, the lens 56, in essence, sees an image of the objective lens modulated by the mask. However, due to the equality of pitch and pattern between the apertures 86 of mask 50 and the focused image, the light flux signal received by the lens 56 is of uniform intensity across the entire five bar output image field viewed by the lens 56. The field of view of each lens is about 5 millimeters and therefore each lens covers most of the five bar signal modulated by the mask. Each condenser lens 56 provides for the collective concentration of the modulated multiple slot uniform signal into a composite signal and the focusing of that composite signal onto the photoelectric detector 58. The ratio of effective focal length to total length for lens 56 is about 1 to 6.

The photoelectric detector or sensor 58 is mounted within the top surface of the optical casing 36 and is suitably connected to the circuitry of the tape rule through a printed circuit board or the like (not shown). One detector 58 is mounted centrally within each channel and is spaced slightly above the field lens 56 to receive the collected composite signal focused thereon by the lense. The detector can be a small unit such as the phototransistors sold by Texas Instruments or equivalent devices. As will be appreciated, the use of the field or condensor lens 56 renders precise critical placement of the detectors unnecessary.

In operation, the grid 22 on the tape blade 12 is illuminated by the LED light source 52 disposed laterally of the longitudinal axis of the tape blade. A stationary objective lens 54 within each channel picks up the diffused reflected light from the grid, typically viewing about five bars 28 of the grid. The objective lens 54 is positioned relative to the light source and the reflecting surface 24 of the tape blade so that the light picked up by the lens is diffused and not direct or specular reflection. The use of diffuse light is important since reflection from the shiny surface of the tape blade with specular light reflection would be so high that the relative reflecting properties of the different grid areas 28 and 30 would produce less relative difference in the level of reflection and effective modulation by the mask would be difficult to achieve. The objective lens 54 focuses an image of the grid on a multiphase optical mask 50, which image is about 1.5 times the size of the grid on the blade. Of course, as can be appreciated, the position of the mask with respect to the objective lens is such as to create a sharp clear image of the tape grid in the plane of the mask. The optical slots 86 of the mask are sized and spaced to match the image of the tape grid as it moves with respect to the objective lens so that the mask modulates the light passing therethrough to completely cut off and completely transmit the signal therethrough and provide a high contrast ratio. The slots in each channel exhibit a 90° phase shift relative to immediately adjacent channels but are uniform within each channel. Of course, the total light flux transmitted by the mask varies continuously and cyclically as the blade moves to provide the requisite signals. A field lens 56 focuses the uniform light intensity signal passing through the mask onto a small detector 58. The use of several optical slots in each reading section permits the use of several bars 28 and light reflecting areas 30 of the grid thereby reducing the risk of error due to change in the reflecting quality of the surface of the blade. Additionally, the composite signal from the mask eliminates the need for critical placement of the photoelectric detector and permits the use of a small detector unit.

As will be apparent to persons skilled in the art, various modifications, adaptations and variations of the foregoing specific disclosure can be made without departing from the teachings of the present invention.

We claim:

1. An optical sensing system for coilable extensible tape rules and the like comprising a movable elongated tape blade having optical markings forming a grid along the length thereof, photoelectric detector means spaced from said grid, a light source for illuminating a portion of said grid as it moves relative to said detector means, an optical mask between said grid and said detector means, objective lens means intermediate said tape grid and said optical mask, said lens means being effective to focus a sharp clear image of said illuminated grid portion on said optical mask whereby said mask provides a uniform modulation of the light image signal through said mask, and field lens means immediately adjacent and downstream of said mask for concentrating the light signal passing through and modulated by said optical mask into a composite signal and for directing the concentrated composite signal onto said detector means.

2. The optical sensing system of claim 1 including an optical reading head overlying the elongated grid and having a casing containing a plurality of reading channels arranged in tandem along said grid, said optical mask extending through a plurality of said reading channels and having a plurality of optical slots exhibiting a phase shift between each reading channel to provide said modulated signal.

3. The optical sensing system of claim 2 wherein the phase shift between optical slots within the mask positioned in non-adjacent reading channels is 180°.

4. The optical sensing system of claim 1 wherein said optical mask has a plurality of optical slots for modulating the focused image and the image includes a plurality of optical markings in registry with said optical slots to provide said modulated signal.

5. The optical sensing system of claim 1, 2 or 4 wherein said light source is disposed laterally of said movable grid, said mask having a plurality of optical slots and the image of said grid focused on said mask being of the same pitch and pattern as said optical slots.

6. The optical sensing system of claim 5 wherein said optical markings are of uniform size and pitch, and the image of said markings focused on said mask are of greater length than the optical slots of said mask.

7. The optical sensing system of claims 1, 2 or 4 including an optical reading head overlying the grid and having a casing containing a plurality of reading channels, the optical path in each channel including said objective lens means, an optical mask, field lens means and detector means, the optical mask within adjacent reading channels exhibiting a 90° phase shift, said light source being disposed laterally of said elongated grid and at an acute angle to the optical path of each station to assure diffuse nonspecular reflection of the grid along said optical path.

8. The optical sensing system of claim 7 including a tape rule housing and wherein said grid is carried on one surface of the tape blade along its longitudinal center line for movement therewith between an extended position and a retracted position within said housing.

9. The optical sensing system of claim 7 wherein each channel has a light source of illuminating a grid portion positioned at said channel.

10. The optical sensing system of claim 2 wherein at least one of said objective lens means and field lens means is a one piece lens strip having a lens element within the optical path of each reading channel.

11. The optical system of claims 1 or 10 wherein the lens means each includes an aspherical lens surface effective to correct optical aberrations in the optical path of the system.

12. The optical system of claim 1 wherein the objective lens means exhibits a ratio of effective focal length to total length from blade to detector means of about 1 to 5.

13. The optical system of claim 1 wherein the field lens means exhibits a ratio of effective focal length to total length from blade to detector means of about 1 to 6.

* * * * *